(12) United States Patent
Miller et al.

(10) Patent No.: US 11,560,064 B2
(45) Date of Patent: Jan. 24, 2023

(54) RENEWABLE ENERGY VEHICLE CHARGING

(71) Applicant: Ford Motor Company, Dearborn, MI (US)

(72) Inventors: Kenneth James Miller, Canton, MI (US); Aed M. Dudar, Canton, MI (US); Douglas Raymond Martin, Canton, MI (US)

(73) Assignee: Ford Motor Company, Dearborn, MI (US)

( * ) Notice: Subject to any disclaimer, the term of this patent is extended or adjusted under 35 U.S.C. 154(b) by 861 days.

(21) Appl. No.: 16/347,050

(22) PCT Filed: Nov. 3, 2016

(86) PCT No.: PCT/US2016/060262
§ 371 (c)(1),
(2) Date: May 2, 2019

(87) PCT Pub. No.: WO2018/084843
PCT Pub. Date: May 11, 2018

(65) Prior Publication Data
US 2020/0070676 A1 Mar. 5, 2020

(51) Int. Cl.
*B60L 53/50* (2019.01)
*B60L 8/00* (2006.01)
(Continued)

(52) U.S. Cl.
CPC .............. *B60L 53/50* (2019.02); *B60L 8/003* (2013.01); *B60L 8/006* (2013.01); *B60L 53/00* (2019.02);
(Continued)

(58) Field of Classification Search
CPC ...................................................... B60L 53/50
(Continued)

(56) References Cited

U.S. PATENT DOCUMENTS 7,828,091 B2 11/2010 Wedderburn, Jr. et al.
8,120,310 B2 2/2012 Littrell et al.
(Continued)

FOREIGN PATENT DOCUMENTS

| CN | 105939885 A | 9/2016 |
|---|---|---|
| WO | 2015114200 A1 | 8/2015 |
| WO | 2016072165 A1 | 5/2016 |

OTHER PUBLICATIONS

Notification of Transmittal of International Search Report and Written Opinion of the International Searching Authority regarding International Application No. PCT/US2016/060262 dated Jan. 31, 2017 (10 pages).
Notification of First Office Action as issued by the Chnese Patent Office dated Nov. 18, 2022 (in Chinese and English).

*Primary Examiner* — Jerry D Robbins
(74) *Attorney, Agent, or Firm* — Brandon Hicks; Bejin Bieneman PLC

(57) ABSTRACT

A renewable energy charging system for increasing the charging efficiency of an autonomous vehicle includes a computer programed to predict, in a vehicle at a plurality of locations, an amount of power generation associated with each location. The computer selects one of the locations based at least on the predicted amounts of power generation and moves the vehicle to the selected location.

17 Claims, 3 Drawing Sheets

(51) Int. Cl.
  *H02J 7/34* (2006.01)
  *B60L 53/00* (2019.01)
  *B60L 53/51* (2019.01)
  *B60L 53/52* (2019.01)
  *B60L 53/53* (2019.01)
  *B60L 53/67* (2019.01)
  *B60L 53/68* (2019.01)
  *H02J 7/00* (2006.01)

(52) U.S. Cl.
  CPC ............... *B60L 53/51* (2019.02); *B60L 53/52* (2019.02); *B60L 53/53* (2019.02); *B60L 53/67* (2019.02); *B60L 53/68* (2019.02); *H02J 7/34* (2013.01); *B60L 2260/50* (2013.01); *H02J 7/0013* (2013.01); *H02J 2300/28* (2020.01); *H02J 2310/48* (2020.01)

(58) Field of Classification Search
  USPC .......................................................... 701/22
  See application file for complete search history.

(56) References Cited

U.S. PATENT DOCUMENTS

| | | | |
|---|---|---|---|
| 8,884,784 B2 | 11/2014 | Kirsch | |
| 10,197,412 B2* | 2/2019 | Dudar | G01C 21/3469 |
| 10,913,360 B2* | 2/2021 | Gaither | B60L 58/13 |
| 10,919,522 B2* | 2/2021 | Chelian | B60W 30/06 |
| 2008/0027639 A1 | 1/2008 | Tryon | |
| 2010/0169008 A1* | 7/2010 | Niwa | G09B 29/106 |
| | | | 701/532 |
| 2011/0191266 A1* | 8/2011 | Matsuyama | G06Q 50/06 |
| | | | 705/412 |
| 2011/0266075 A1* | 11/2011 | Guzelimian | F03D 9/32 |
| | | | 180/2.2 |
| 2012/0262104 A1 | 10/2012 | Kirsch | |
| 2013/0057023 A1 | 3/2013 | Kim et al. | |
| 2013/0175974 A1 | 7/2013 | Bassham et al. | |
| 2013/0226441 A1 | 8/2013 | Horita | |
| 2013/0231824 A1 | 9/2013 | Wilson et al. | |
| 2013/0285841 A1* | 10/2013 | Kirsch | G08G 1/143 |
| | | | 340/932.2 |
| 2017/0045888 A1* | 2/2017 | Mattila | B60L 53/35 |

* cited by examiner

RENEWABLE ENERGY VEHICLE CHARGING

BACKGROUND

Autonomous electric vehicles are becoming more widespread. Such vehicles typically charge by being plugged into a utility power grid, or may be charged using available renewable resources, e.g. charging via solar or wind power. However, renewable resources can be unavailable and/or less efficient in various locations.

DETAILED DESCRIPTION

Introduction

A renewable energy charging system 20 (see FIG. 1) provides a hardware and software infrastructure to maximize the efficiency of an autonomous rechargeable electric vehicle 300 (see FIG. 3) receiving energy from natural renewable sources, such as solar and wind power. The system 20 provides a solution to the problem of rechargeable vehicles 300 being parked in locations that are less than ideal for charging, such as locations that are in the shade or on a leeward side of a building. Accordingly, a computer 30 of the system 20 in a vehicle 300 (see FIGS. 1 and 3) is programmed to predict power generation at a plurality of locations, select one the locations based at least on the predicted power generation, and move the vehicle 300 to the selected location.

The computer 30 may take into account additional considerations, such as distances to the locations, location types, and risk factors associated with the locations when selecting one of the locations.

Once the location has been selected, and before moving to the selected location, the computer 30 may determine whether a move threshold, i.e. a value indicating the vehicle 300 should be moved to the location for charging, is met by the selected location, e.g. whether the energy expended in moving to the selected location is less than the predicted gains in power generation at the selected location.

In the following description, the adjectives "first" and "second" are used throughout this document as identifiers and are not intended to signify importance or order.

System

Figure 1:
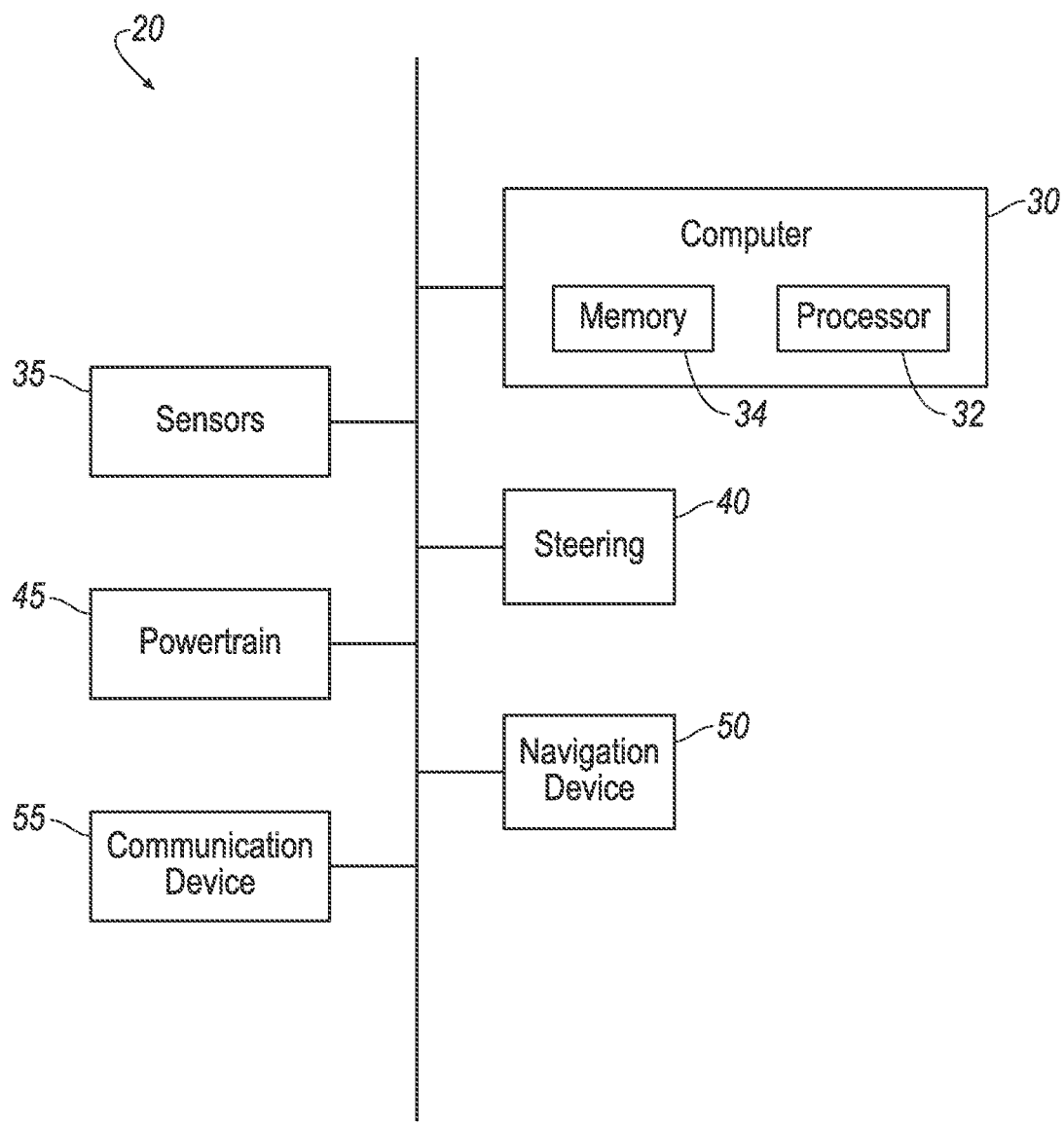
FIG. 1 is a block diagram of components of an example renewable energy charging system.

As shown in FIG. 1, a renewable energy charging system 20 includes a computer 30 in communication with one or more sensors 35, a steering 40, a powertrain 45, a navigation device 50, and a communication device 55.

The computer 30 is a computing device that includes a processor 32 and a memory 34.

The processor 32 is implemented via circuits, chips, or other electronic components and may include one or more microcontrollers, one or more field programmable gate arrays (FPGAs), one or more application specific circuits (ASICs), one or more digital signal processors (DSPs), one or more customer integrated circuits, etc. The processor 32 is programmable to process the data and communications received via the memory 34, the sensors 35, the steering 40, the powertrain 45, the navigation device 50, and the communication device 55. Processing the data and communications may include processing to move the vehicle 300 from one location to another while predicting power generation at each location, select one of the locations based on the predicted power generation, and move the vehicle 300 to the selected location when a move threshold has been met. As described below, the processor 32 instructs vehicle 300 components to actuate based on the sensor data.

The memory 34 is implemented via circuits, chips or other electronic components and can include one or more of read only memory (ROM), random access memory (RAM), flash memory, electrically programmable memory (EPROM), electrically programmable and erasable memory (EEPROM), embedded MultiMediaCard (eMMC), a hard drive, or any volatile or non-volatile media etc. The memory 34 may store instructions for performing the processes described herein, and data collected from sensors and communications.

The computer 30 is in electronic communication with one or more conventional and known (and therefore not shown in the drawings) input devices for providing data to the computer 30 and one or more output devices for receiving data and/or instructions from the computer 30 e.g., to actuate an output device. Exemplary input devices include: human machine interfaces (HMIs) such as a switch or graphical user interface (GUI); imaging devices such as LiDAR, still and/or video cameras, infrared sensors, the steering 40, the powertrain 45, the navigation device 50, the communication device 55 etc., as well as other sensors and/or electronic control units (ECUs) that are known to provide data, e.g., on a vehicle communications bus or network, such as, radar, ultrasonic sensors, accelerometers, gyroscopes, pressure sensors, thermometers, barometers, altimeters, current sensing devices, voltage sensing devices, microphones, light sensors, etc. etc. Exemplary output devices that may be actuated by the computer 30 include: warning light and audible subsystems; HMIs, the steering 40, the powertrain 45, the navigation device 50, the communication device 55, etc.

The sensors 35 collect and send data to the computer 30. The sensors 35 may detect internal states of the vehicle 300, for example, wheel speed, wheel orientation, and engine and transmission variables. The sensors 35 may detect the position or orientation of the vehicle 300, for example, global positioning system (GPS) sensors; accelerometers such as piezo-electric or microelectromechanical systems (MEMS); gyroscopes such as rate, ring laser, or fiber-optic gyroscopes; inertial measurements units (IMU); and magnetometers. The sensors 35 may detect the external world, for example, light measurement sensors, photometers, wind speed measurement sensors, radar sensors, scanning laser range finders, light detection and ranging (LIDAR) devices, and image processing sensors such as cameras.

The steering 40 is in communication with the computer 30. Upon actuation by the computer 30, the steering 40 alters and/or maintains a steering angle of one or more tires of the vehicle 300. For example, the steering 40 controls known electric and hydraulic systems in the vehicle 300 which affect the steering angle of one or more tires of the vehicle 300.

The powertrain 45 is in communication with the computer 30. Upon actuation by the computer 30, the powertrain 45 provides a torque to wheels of the vehicle 300, propelling the vehicle 300 forward. The powertrain 45 may include an electric motor, a battery pack and a charging system, such as known solar and wind powered charging systems. The powertrain 45 may further include an internal combustion engine. The battery pack is connected to the electric motor and the charging system. In a conventional electric powertrain, the electric motor is rotationally coupled to the transmission. In a hybrid powertrain, the electric motor is coupled to the transmission and transmits rotational kinetic energy to the transmission, and the internal-combustion engine may be coupled to the electric motor or to the transmission. The transmission transmits the kinetic energy from the electric motor and/or the internal-combustion engine to a drive axle and ultimately to wheels of the vehicle 300, while applying a gear ratio allowing different tradeoffs between torque and rotational speed.

The navigation device 50 is in communication with the computer 30. The navigation device 50 determines a location of the vehicle 300 relative to stored map data. To determine the location, the navigation device 50 may rely on information from a global navigation satellite system, distance data from sensors 35 attached to a drivetrain of the vehicle 300, a gyroscope and/or an accelerometer. The map data may be stored locally, such as on the memory 34, or on the navigation device 50. Additionally, and/or alternatively, the map data may be stored on a remote computer or network, accessible via the communication device 55. Exemplary navigation devices 50 include known navigation devices that utilize GPS (global positioning system), Wi-Fi, and/or cellular location identification technologies, such as personal navigation devices and automotive navigation systems.

The communication device 55 is in communication with the computer 30. The communication device 55 transmits and receives information wirelessly from other communication devices, enabling signals, data and other information to be exchanged other computer and network systems. Exemplary communication devices 55 include known Wi-Fi systems, radio transmitters and receivers, telecommunications systems, Bluetooth systems, cellular systems and mobile satellite communication devices.

Process

Figure 2:
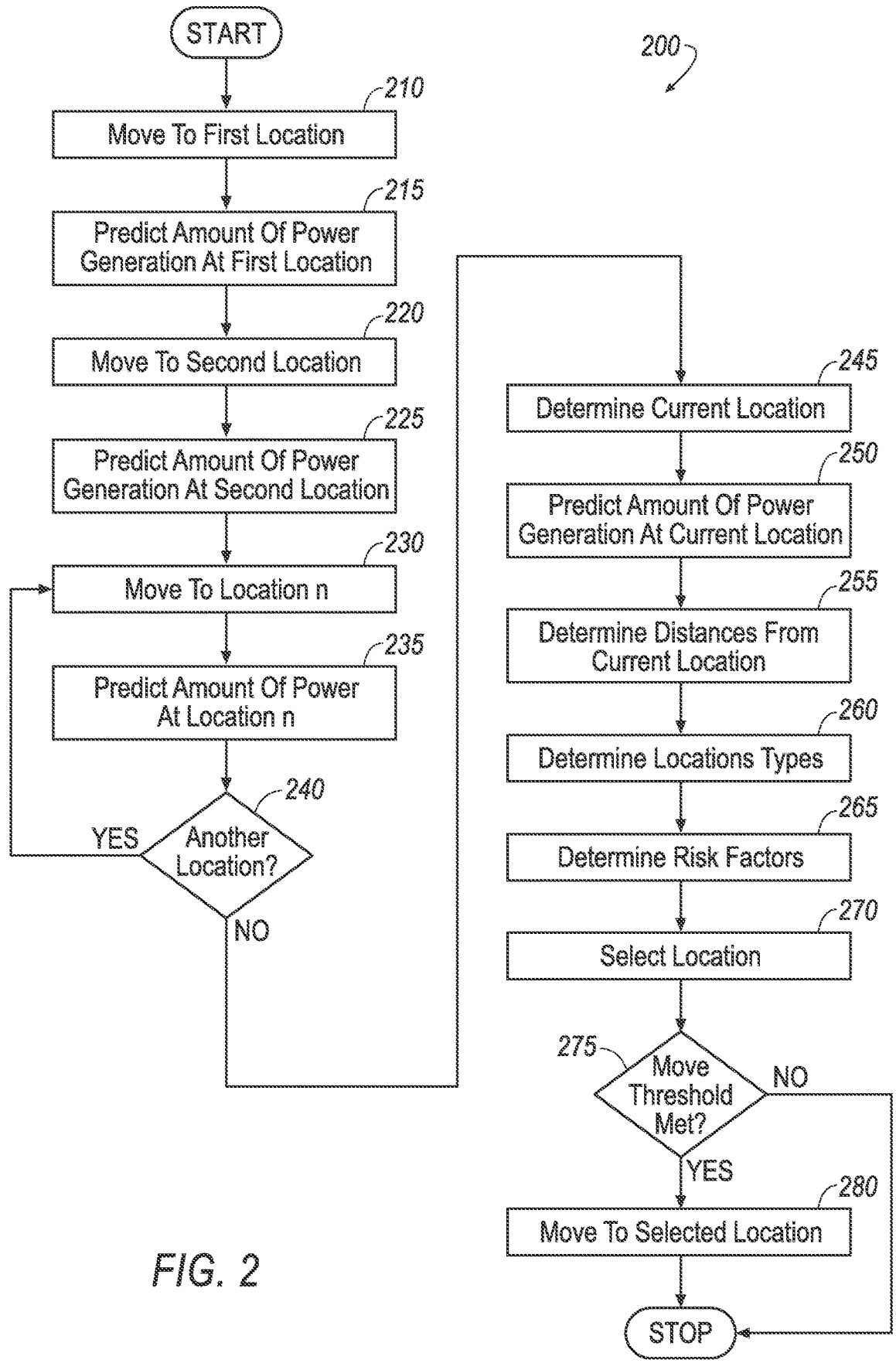
FIG. 2 illustrates a flow chart of an example process for charging a vehicle.

Referring to FIG. 2, the process 200 begins based on the computer 30 in a rechargeable vehicle 300 (see FIG. 3) receiving an instruction to begin the process 200, or by generating its own instruction to begin the process 200. For example, the computer 30 may receive an input from a user through a HMI associated with the computer 30. In another example, the computer may self-determine that the instruction to begin should be generated, for example based on the time of day, from data received from the sensors 35, such as data indicating a change in the amount of light striking the vehicle, from a park instruction occurring after the autonomous vehicle 300 has reached a desired destination, etc.

Next, at a block 210, the computer 30 causes the vehicle 300 to move to a first location. The computer 30 may cause the vehicle 300 to move by actuating the powertrain 45 and the steering 40. The computer 30 may use the navigation device 50, and map data stored therein, to determine coordinates, e.g. geo-coordinates as are known, of the first location. For example, location data may include data identifying a Cartesian coordinate system location, such as latitudinal and longitudinal coordinates of the first location. The location data may alternatively or additionally include vector data, including a direction and a distance, from a reference location, such as an intersection or building. The location data may be used to determine distances between other locations, a location type, and risk factors associated with the location, as further discussed below. The computer 30 may use the navigation device 50 to provide navigation data for use in actuating the powertrain 45 and the steering 40 when moving the vehicle 300 to the location.

The distance traveled to the first (and any subsequent) location may be shorter, e.g. 20 ft., or longer, e.g. 100 yards, depending on the surrounding geographic and other features, such as user preferred locations, proximity of the locations to the user's residence or place of employment, etc. For example, the computer 30 may contain instructions to limit movement of the vehicle 300 to within a certain geographic area. The distance to the first location may be as small as zero, e.g., when the vehicle 300 starts the process 200 at the first location. In such situation, the computer 30 may begin the process at a block 215.

At the block 215, while the vehicle 300 is at the first location, the computer 30 predicts a first amount of power generation. The amount of power generation may be based on data received by the computer from one or more of the sensors 35. For example, the sensors 35 may measure the brightness of light striking the vehicle 300 to estimate the power generation from solar energy, where the higher measured brightness the higher the predicted power generation, e.g. a location measuring 30,000 lux has higher predicted power generation than a location measuring 25,000 lux. In another example, the sensors 35 may measure wind speed to estimate the power generation from wind energy, where the higher the measured wind speed the higher the predicted power generation, e.g. a location measuring 15 mph average wind speed has higher predicted power generation than a location measuring 5 mph wind speed. The measured brightness and wind speed may be used to predict power generation by comparing the measured sensor values to sensor values associated with power generation rates in a lookup table stored as a file on the computer 30. The relationship between sensor value and power generation rates may be predetermined and populated into the table based at least on performance characteristics of various solar and wind power generation devices supported on the vehicle 300.

At a block 220, the computer 30 causes the vehicle 300 to move to a second location. The computer may cause the vehicle 300 to move by actuating the powertrain 45 and the steering 40. Actuation of the steering 40 and powertrain 45 may be based at least on information received from the navigation device 50. The computer 30 may use the navigation device 50, and map data stored therein, to determine location data, e.g. as described above, of the second location. The computer 30 may use the navigation device 50 to provide navigation data to navigate the vehicle 300 to and from the second location.

At a block 225, while the vehicle 300 is at the second location, the computer 30 predicts a second amount of power generation, e.g. as described above.

At a block 230, the computer 30 causes the vehicle 300 to move to a different location, e.g. a third location, a fourth location, . . . a $n^{th}$ location. The computer may cause the vehicle 300 to move by actuating the powertrain 45 and the steering 40. Actuation of the steering 40 and powertrain 45 may be based at least on information received from the navigation device. The computer 30 may use the navigation device 50, and map data stored therein, to determine location data, e.g. as described above, of the different location. The computer 30 may use the navigation device 50 to provide navigation data to navigate the vehicle 300 to and from the different location.

At a block 235, while the vehicle 300 is at the different location, the computer 30 predicts an amount of power generation, e.g. as described above.

At a block 240 the computer 30 determines if a sufficient number of locations have had their associated power generation predicted. The sufficient number of locations is equal, to or less than, an available number of locations. The determination of whether a sufficient number of power generation locations have been predicted may be determined based on: whether predicting power at a predetermined number of locations has been performed; whether a location with predicted power generation above a threshold has been identified; whether power generation has been predicted over a certain geographical area or route, etc. When the computer 30 determines that the sufficient number of locations have been measured, the computer moves to a block 245. When the computer 30 determines that the sufficient number of locations have not been measured, the computer returns to block 230.

At a block 245, the computer 30 determines a current location of the vehicle 300. The computer 30 may use the navigation device 50, and map data stored therein, to determine location data of the current location. Location data may include data identifying a Cartesian coordinate system location, such as latitudinal and longitudinal coordinates of the current location. The location data may include vector data, including a direction and a distance, from a reference location, such as an intersection or building.

At a block 250, while the vehicle 300 is at the current location, the computer 30 predicts an amount of power generation, e.g. as described above.

At a block 255, the computer 30 determines the distances between the current location and each of the other locations, such as the first location and the second location, associated with a predicted power generation. The computer 30 may use the navigation device 50, map data, and location data associated with each location to determine the distances, e.g. using known techniques.

At a block 260, the computer 30 determines a location type for each of the locations associated with a predicted power generation. Location types are categories of locations that affect the availability of the location as a parking space for the vehicle 300, and/or affect the user's ability to access the vehicle 300. Exemplary location types include: user approved locations, private locations, public locations, the locations proximity a user's home or work, etc. To determine the location type, the computer 30 may: compare the location with data available on map data stored on the computer; receive information about the location, including the location type, from a user, such as through a HMI; receive information about the location from another computer or information network, such as information received through the communication device 55 from a remote server, a portable computing device, or from information otherwise available on the Internet.

At a block 265, the computer 30 determines risk factors associated with each of the locations. Risk factors are factors that could affect the availably of continued power generation at the predicted power generation rate. Exemplary risk factors may include: an expected duration of time available at the location for the vehicle 300 to park, such as parking locations having a maximum allowed parking time; an expected duration of charging availably, such as parking locations that may be expected to be in a shadow within a threshold amount of time, e.g. 1 hr.; distance from the user's work or home; distance from the current location; whether the location is in a parking lot or on a street; etc. The expected duration of charging availability may be based on information received by the computer 30 regarding a weather forecast, or based on information regarding the geographic properties, i.e. physical landscape characteristics, of an area proximate the location, such as information regarding a height of a building, tree, or other structure. Determining the risk factors for each location may be performed as a single processing step where all of the risk factors associated with the various locations are determined. Alternatively, the risk factor determination may be broken into a series of discrete steps, such as determining the risk factors for a location while the vehicle 300 is at that location, such as during generally the same time as predicting the power generation. An exemplary risk factor calculation is found below, when n equals a number of points, and n-power is the points awarded for a given power generation amount, n-risk is the number of points deducted based on the risk factor(s), and n-location is the resulting amount of points associated with the location. The number of points for n-power and n-risk may be determined based on a lookup table stored as a file on the computer 30, the lookup table associating rates of predicted power generation with a certain number of points, and associating certain risk factors with certain numbers of points.

$$n_{power} - n_{risk} = n_{location}$$

At a block 270, the computer 30 selects one the locations based at least on the predicted amount of power generation. The computer 30 may consider distances from the current location, location types, and the risk factors for each location. For example, the computer 30 may allocate a certain number of points to a location based on the predicted power generation at that location, where the higher the predicted amount of power generation, the more points allocated. The computer 30 may then adjust the point allocation of that location based on the associated risk factors. For example, if the location is predicted to be in the shade, points may be deducted. In another example, if the location is a user selected location, points will be added. In another example, the greater the distance from the current location, the more points deducted. Once points have been allocated and adjusted for each location, the computer 30 may select the location associated with the most amount of points.

At a block 275, the computer 30 determines whether a move threshold is met. The move threshold can be used to determine whether moving the vehicle 300 to the selected location is worth the effort, i.e. whether to move the vehicle 300 to the selected location.

For example, to determine whether the move threshold has been met, the computer 30 may determine the difference between the predicted power generation at the selected location and the predicted power generation at the current location. The determined difference may be compared to the move threshold, e.g. an amount of energy determined to be required to move the vehicle 300 to the selected location. When the difference in predicted power generation is greater than the move threshold, the computer 30 may determine that the move threshold has been met. When the difference in predicted power generation is less than the move threshold, e.g. the energy required for moving to the selected location, the computer 30 may determine that the move threshold has not been met.

In another example, the computer 30 may compare the amount of points associated with the selected location, as discussed above, with a move threshold that is a number of points. The move threshold number of points may be set by a manufacture of the vehicle 300, or by a user of the vehicle 300. When the points associated with the selected location is greater than the threshold number of points, the computer 30 may determine that the move threshold has been met. When the points associated with the selected location is less than the threshold number of points, the computer 30 may determine that the move threshold has not been met.

At a block 280, when the move threshold has been met, the computer 30 causes the vehicle 300 to move to the selected location. The computer may cause the vehicle 300 to move by actuating the powertrain 45 and the steering 40. Actuation of the steering 40 and powertrain 45 may be based at least on information received from the navigation device 50.

Figure 3:
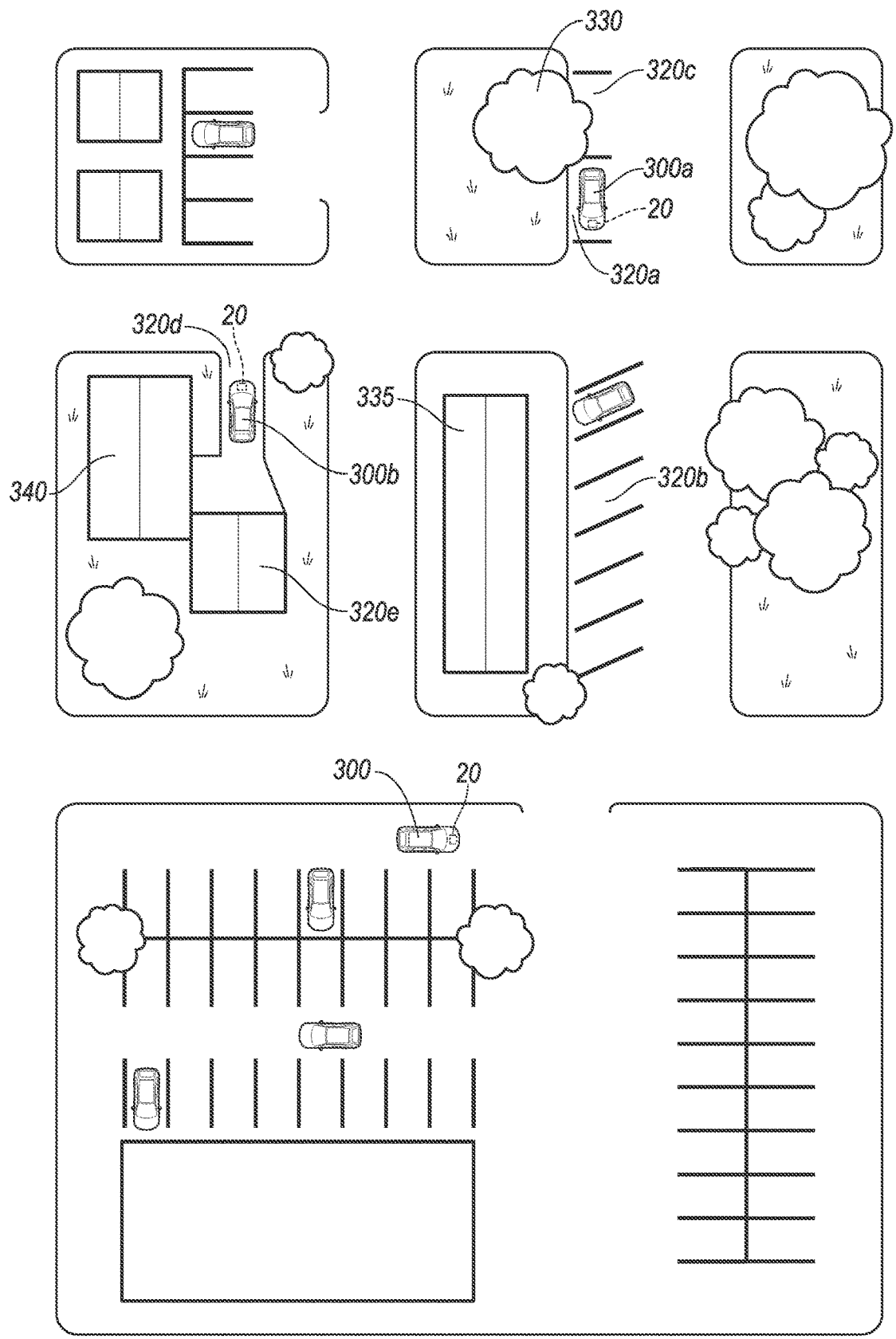
FIG. 3 is a top plan view illustrating vehicles with the system of FIG. 1 performing the process of FIG. 2.

With reference to FIG. 3, autonomous vehicles 300a and 300b having the system 20 are shown performing various blocks of the process 200. References in the following discussion of the vehicles 300a and 300b performing various operations according to blocks of process 200 are understood to use the system 20, such as using the computer 30, to perform the various moves, predictions, and determinations.

Vehicle 300a is parked at location 320a. Prior to parking at location 320a, vehicle 300a initially moved to location 320b (block 210) and predicted a first amount of power generation (block 215). Then vehicle 300a moved to location 320a (block 220) and predicted a second amount of power generation (block 225). Then vehicle 300a moved to location 320c and predicted a third amount of power generation. Location 320c had a lower predicted power generation that the other locations because of a tree 330 casting shade. While at location 320c, the vehicle 300a determined its current location (block 245), and the distance to the other locations 320a and 320b (block 255). Next, the vehicle 300a determined the risk factors associated with the locations 320a-c (block 265). Location 320b had a risk factor created by a building 335 that may create a shadow later in the day. After determining the risk factors, the vehicle 300a selected location 320a because location 320c had lower predicted power generation, and location 320b had higher risk factors (block 270). Vehicle 300a then determined that the increase in power generation available at the selected location 320a, e.g., the difference between predicted power generation at locations 320a and 320c, was greater than the energy it would take to move from the current location 320c to the selected location 320a, and concluded that the move threshold had been met (block 275). The vehicle 300a then moved to the selected location 320a (block 280).

Vehicle 300b is parked at location 320d. Prior to parking at location 320d, vehicle 300b stopped proximate a user's residence 340 to drop off the user. The user instructed the vehicle 300b through a HMI to remain within proximity of the residence 340. Then vehicle 300b moved to location 320d (block 220) and predicted a first amount of power generation (block 225). The vehicle 300b then moved to location 320e (block 210) and predicted a second amount of power generation (block 215). The predicted power generation at location 320e was lower than at location 320d, as location 320e was in the shade of a garage of the residence 340. While at location 320e, the vehicle 300b determined its current location (block 245) and the distance to the location 320d (block 255). The vehicle 300b selected location 320d because location 320e had lower predicted power generation (block 270). Vehicle 300b then determined that the increase in power generation available at the selected location 320d was greater than the energy it would take to move from the current location 320e to the selected location 320d, and concluded that the move threshold had been met (block 275). The vehicle 300b then moved to the selected location 320d (block 280).

Conclusion

Computing devices as discussed herein generally each include instructions executable by one or more computing devices such as those identified above, and for carrying out blocks or steps of processes described above. Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in the computing device 105 is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of systems and/or processes herein are provided for the purpose of illustrating certain embodiments, and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

What is claimed is:

1. A computer comprising programming to:
predict, in a vehicle at a plurality of locations, an amount of power generation associated with each location;
select one of the locations based at least on the predicted amounts of power generation;
determine that a move threshold has been met; and
move the vehicle to the selected location after the move threshold has been met,
wherein the determination of whether the move threshold has been met comprises:
determining a difference in power generation between a current location and the selected location; and
determining an energy required to move the vehicle to the selected location;
wherein the move threshold is met when the difference is greater than the energy required.

2. The computer of claim 1, further comprising programming to:
after predicting amounts of power generation at each of the plurality of locations, determine a current location of vehicle; and
determine distances between the plurality of locations and the current location;
wherein selecting one of the locations is further based at least on the respective distances to the locations from the current location.

3. The computer of claim 1, wherein the amount of power generation is predicted based at least on data received from a light sensor supported on the vehicle.

4. The computer of claim 1, wherein the amount of power generation is predicted based at least on data received from a wind sensor supported on the vehicle.

5. The computer of claim 1, further comprising programming to:
determine a risk factor associated with each of the plurality of locations;
wherein selecting one of the locations is further based at least on the risk factors.

6. The computer of claim 5, wherein the risk factors are based at least on information regarding the geographic properties of an area proximate the plurality of locations.

7. The computer of claim 1, further comprising programming to:
determine a location type of each of the plurality of locations;
wherein selecting one of the locations is further based at least on the determined location types.

8. The computer of claim 1, further comprising programming to:
determine respective distances between a structure and each of the plurality of locations;
wherein selecting one of the locations is further based at least on the distances to the locations from the structure.

9. A method comprising:
predicting, in a vehicle at a plurality of locations, an amount of power generation associated with each location;
selecting one of locations based at least on the predicted amounts of power generation;
determining that a move threshold has been met; and
moving the vehicle to the selected location after the move threshold has been met,
wherein determining that the move threshold has been met comprises:
determining a difference in power generation between a current location and the selected location; and
determining an energy required to move the vehicle to the selected location;
wherein the move threshold is met when the difference is greater than the energy required.

10. The method of claim 9, further comprising:
after determining the amount of power generation at the plurality of locations, determining a current location of vehicle; and
determining distances between the current location and each of the plurality of locations;
wherein selecting one of the locations is further based at least on the determined distances between the current location and plurality of locations.

11. The method of claim 9, wherein the amount of power generation available is predicted based at least on data received from a light sensor supported on the vehicle.

12. The method of claim 9, wherein the amount of power generation available is predicted based at least on data received from a wind sensor supported on the vehicle.

13. The method of claim 9, wherein at least one of the plurality of locations is a user determined location.

14. The method of claim 9, further comprising programming for:
determining a risk factor associated with each of the plurality of locations;
wherein selecting one of the locations is further based at least on the determined risk factors associated with the locations.

15. The method of claim 14, wherein the determined risk factors associated with the locations are based at least on an expected duration of charging availably at the locations.

16. The method of claim 9, further comprising programming for:
determining location types for the plurality of locations;
wherein selecting one of the locations is further based at least on the determined location types of the locations.

17. The method of claim 9, further comprising programming for:
determining a distance between a structure and each of the plurality of locations;
wherein selecting one of the locations is further based at least on the determined distances between the structure and the locations.

* * * * *